UNITED STATES PATENT OFFICE.

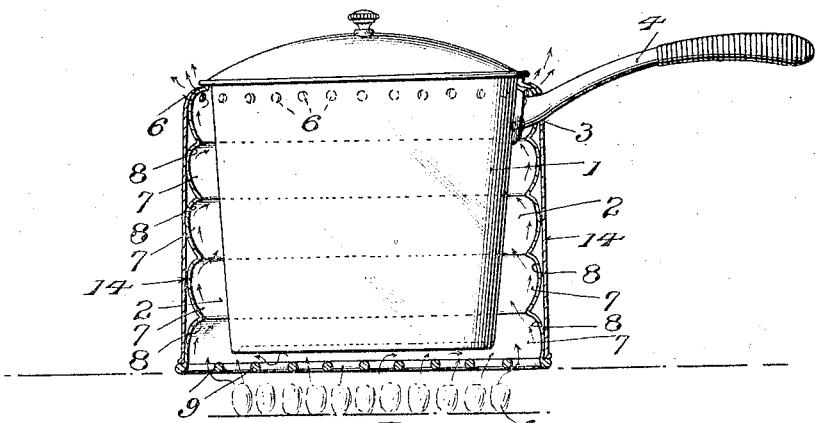
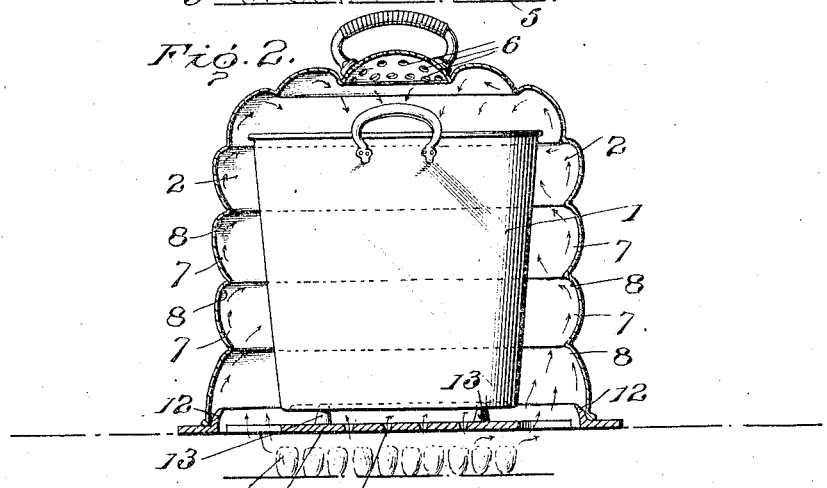
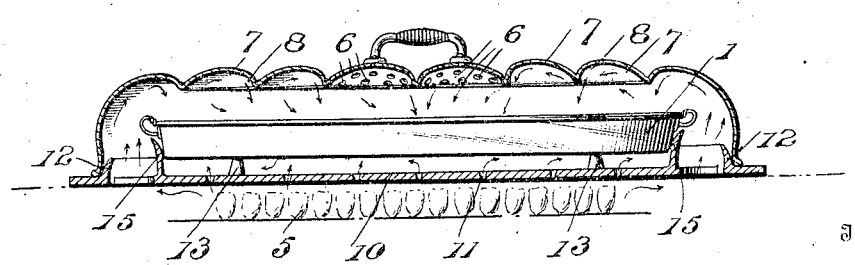

DAVID H. COLES, OF BROOKLYN, NEW YORK.

CULINARY UTENSIL.

935,189.

Specification of Letters Patent. Patented Sept. 28, 1909.

Application filed May 6, 1907. Serial No. 372,486.

*To all whom it may concern:*

Be it known that I, DAVID H. COLES, of Brooklyn, New York, have invented a new and useful Improvement in Culinary Utensils, which invention is fully set forth in the following specification.

The present invention relates to culinary utensils, and more particularly to such utensils provided with means for economizing fuel and preventing burning of the contents of the container.

It has heretofore been proposed to cover and encircle the container with a jacket, formed either integrally therewith or separately therefrom, the function of this jacket being to confine the heat between itself and the wall of the container or utensil; and the present invention is, specifically, an improvement in said enveloping or encircling jacket, and has for its object to effect a more complete utilization of the heat and consequent economy of the fuel and the quicker and more thorough cooking of the food by localizing the heat and applying it more uniformly over the surface of the utensil or container. Briefly stated, these objects are attained by corrugating the walls of the jacket or cover, the curves of said corrugations acting to uniformly deflect and apply the heat to the container and the contents thereof, whereby a greater proportion of the heat is utilized than heretofore.

A further object is to provide a bottom for said jacket, having suitable openings or spaces for the passage of the heat from the burner or other source of heat, to the end that the said jacket may be used on burners or stoves of smaller diameter than itself, and in order that the amount of heat passing through said spaces or openings to said container may be regulated by providing said bottom with a greater or smaller number of openings or spaces of suitable size.

The invention will be better understood by reference to the accompanying drawings, wherein—

Figure 1 is an elevation, partly in section, illustrating a jacket open at the top; Fig. 2 illustrates a different expression of the inventive idea, showing the jacket closed at the top; and Fig. 3 illustrates a form of jacket employed with long flat pans.

Referring to the drawings, 1 is a suitable container for food or other articles, to which heat is to be applied, and 2 is a jacket surrounding said container. As shown in Fig. 1, said jacket 2 is open at the top, the upper edge thereof fitting closely around said container 2 and being provided with a cut-away portion 3 through which the handle 4 of the container passes. A suitable burner or other source of heat is indicated at 5 for applying heat to the container, and said jacket 2 is provided at its upper edge with perforations 6 through which surplus heat escapes.

Heretofore the jackets used in connection with cooking utensils have had straight or plain sides, the result of this being that the heat would, on striking said sides, take a perpendicular course in ascending, and the sides of the vessel having abstracted the heat adjacent to it, the remainder of the column of heat would pass upward along the jacket and escape, and accordingly much of the heat was lost with a resulting waste of fuel. This objection is remedied in the present device by providing the jacket 3 with corrugations 7 which insure that the whole column of heat is deflected against the container and its contents. The first corrugation throws the heat against the container; it is deflected by the container back against the corrugations, to be again deflected against the container; and so on, until it reaches the top, where it escapes through perforations 6. It will be observed that the heat is retarded in its ascent by this reverberatory motion thereof, the sides of the vessel or container thus abstracting a very large proportion of the heat that enters at the bottom of the jacket. Care should, of course, be taken to shape the corrugations so as to cause them to most effectively project the heat against the walls of the container, and this end is best subserved by bulging the ends 8 of the corrugations last reached by the heat, though any other suitably shaped corrugations may be employed.

The jacket 3 may have associated therewith a bottom provided with suitable openings or spaces for the passage of the heat from the burner or other source. Such a bottom is desirable when a burner or stove which is of less diameter than said jacket is employed, and when it is desired to regulate the amount of heat admitted to the container.

In Fig. 1 such bottom is constituted by bars or rods 9 connected to the lower circumference of the jacket, and in Figs 2 and 3 by a foraminous plate 10 provided with 3 perforations 11, of suitable size and number, and this foraminous plate may be made thick—or preferably covered with asbestos or other substance—to exclude the heat which does not pass through the openings therein. The amount of heat which reaches the bottom of the container may thus be regulated to equal the heat applied to the sides and top, and accordingly there may be secured an even temperature on the bottom, sides and top of the container. The plate 10 is also provided with lugs 12 for preventing the accidental slipping of the jacket, and with lugs 13 on which the container rests. When large containers are used it is sometimes desirable, in order to more effectively retain the heat within the jacket 2, to provide the latter with a double wall, and such a construction is shown in Fig. 1, wherein a plain outer wall 14 is shown surrounding the corrugated wall heretofore described, this construction minimizing the loss of heat by radiation to the outside atmosphere. Of course this wall 14 may also be corrugated.

In Fig. 3 is shown the application of the jacket to pans for broiling, baking, roasting, etc., illustrating the manner in which the jacket acts to deflect the heat upon the food or other substance in the container 1. Lugs 15 are provided for holding the container in the desired position. It will thus be obvious that the provision of a corrugated jacket, by retarding the ascent of the heat and continuously deflecting the same against the sides of the container and its contents, results in a more complete utilization of the heat and consequent economy of the fuel; applies the heat more uniformly over the surface of the container, thus insuring a rapid and more thorough cooking of the food; reduces to a minimum the liability of burning or scorching the same; and economizes the time of the attendant in obviating the necessity of stirring the food, as has heretofore been necessary.

By the expression "bulged at one end", as used in claim 2, it is meant that the portion or commencement of each of the corrugations first encountered by the heat current is an arc of a circle of greater radius than the portion or end of each of the corrugations which is last encountered by the heat current.

What is claimed is:

1. In combination, a culinary utensil and a jacket therefor having a continuous surface provided with horizontal corrugations which are formed to repeatedly and successively project the ascending heat current against the utensil and its contents, and a perforation provided in the upper part of said jacket.

2. In combination, a culinary utensil and a jacket therefor having a continuous surface provided with horizontal, heat-deflecting corrugations bulged at one end thereof, said jacket having a perforation in the upper part thereof.

3. In combination, a culinary utensil and a jacket therefor having a continuous surface provided with horizontal heat-deflecting corrugations and a perforation in the upper part thereof, and an additional jacket surrounding said corrugated jacket.

4. In combination, a jacket for culinary utensils having a continuous surface provided with horizontal corrugations which are formed to repeatedly and successively project the ascending heat current against the utensil and its contents, said jacket being provided with a perforation in the upper part thereof, and a plate on which said jacket rests provided with openings or spaces for the passage of the heat.

5. In combination, a culinary utensil, a foraminous plate on which said utensil rests, and which governs the amount of heat admitted to the bottom, a jacket for said utensil having a continuous surface provided with horizontal corrugations which are formed to repeatedly and successively project the ascending heat currents against the utensil and its contents, and a perforation in the upper part of said jacket, said jacket surrounding the utensil and resting on said plate, and lugs on said plate for preventing the accidental slipping of said jacket.

In testimony whereof I have signed this specification in the presence of two subscribing witnesses.

DAVID H. COLES

Witnesses:
B. L. SCOTT,
W. H. HARTING.